United States Patent
Nishioka

(10) Patent No.: US 9,898,092 B2
(45) Date of Patent: Feb. 20, 2018

(54) INPUT APPARATUS

(71) Applicant: FUNAI ELECTRIC CO., LTD., Osaka (JP)

(72) Inventor: Ken Nishioka, Kawachinagano (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 267 days.

(21) Appl. No.: 14/748,966

(22) Filed: Jun. 24, 2015

(65) Prior Publication Data
US 2015/0378441 A1    Dec. 31, 2015

(30) Foreign Application Priority Data

Jun. 25, 2014  (JP) .................................. 2014-130608

(51) Int. Cl.
*G06F 3/01*        (2006.01)
*G06F 3/042*       (2006.01)

(52) U.S. Cl.
CPC ............ *G06F 3/017* (2013.01); *G06F 3/0421* (2013.01); *G06F 3/0423* (2013.01)

(58) Field of Classification Search
CPC ....... G06F 3/017; G06F 3/0421; G06F 3/0423
USPC ......................................................... 345/175
See application file for complete search history.

(56) References Cited

U.S. PATENT DOCUMENTS

| | | | |
|---|---|---|---|
| 5,525,764 A * | 6/1996 | Junkins ................. | G06F 3/0423 178/18.01 |
| 8,902,435 B2 | 12/2014 | Hirai | |
| 8,985,774 B2 | 3/2015 | Maekawa | |
| 2009/0153523 A1 * | 6/2009 | Morrison .............. | G06F 3/0428 345/175 |
| 2010/0110384 A1 * | 5/2010 | Maekawa .............. | G02B 5/124 353/10 |
| 2011/0267262 A1 * | 11/2011 | Gollier .................. | G06F 3/0423 345/156 |
| 2014/0078516 A1 * | 3/2014 | Hirai .................... | G06F 3/0421 356/614 |

FOREIGN PATENT DOCUMENTS

| | | |
|---|---|---|
| EP | 2 711 809 | 3/2014 |
| JP | 60-218017 | 10/1985 |

(Continued)

OTHER PUBLICATIONS

Extended European Search Report dated Oct. 20, 2015 in corresponding European Application No. 15173727.7.

*Primary Examiner* — Tony Davis
(74) *Attorney, Agent, or Firm* — Wenderoth, Lind & Ponack, L.L.P.

(57) ABSTRACT

An input apparatus includes: a light source that emits detection light toward a first direction, and raster scans a detection interface defined in space, with the detection light; a first light sensor that is disposed closer to the light source than the detection interface, and detects first reflected light which is the detection light that has been reflected; a second light sensor that detects second reflected light which is the detection light that has been reflected off an instructing body that has entered a detection region extending from the detection interface toward the light source; and a control unit that detects a coordinate value of the instructing body using received-light data obtained by the first light sensor and the second light sensor receiving light at the same timing.

17 Claims, 13 Drawing Sheets

(56) References Cited

FOREIGN PATENT DOCUMENTS

| | | |
|---|---|---|
| JP | 2010-12158 | 1/2010 |
| JP | 2010-231504 | 10/2010 |
| WO | 2008/123500 | 10/2008 |

\* cited by examiner

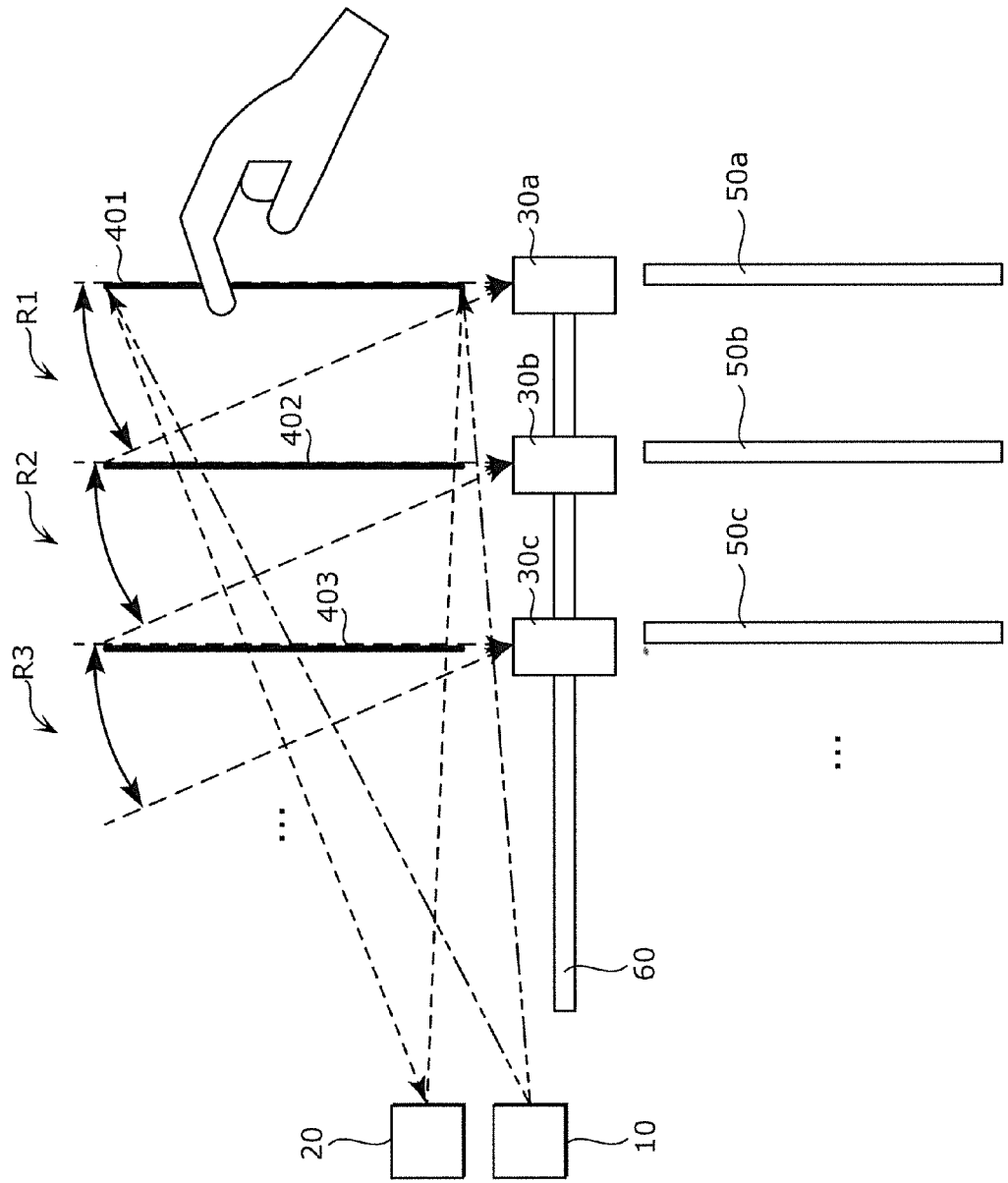

INPUT APPARATUS

CROSS REFERENCE TO RELATED APPLICATION

The present application is based on and claims priority of Japanese Patent Application No. 2014-130608 filed on Jun. 25, 2014. The entire disclosure of the above-identified application, including the specification, drawings and claims is incorporated herein by reference in its entirety.

FIELD

The present invention relates to an input apparatus that identifies a position of an instructing body in three-dimensional space to enable input corresponding to the position.

BACKGROUND

There are known conventional input apparatuses that identify a position of an instructing body in three-dimensional space to enable input corresponding to the position (for example, see Patent Literature (PTL) 1). According to the technique disclosed in PTL 1, an image captured by a camera is analyzed so that a position of an instructing body is identified.

CITATION LIST

Patent Literature

[PTL 1] WO 2008/123500

SUMMARY

Technical Problem

However, the technique disclosed in PTL 1 uses a camera, which increases the size of the apparatus itself. Another problem with the technique is that advanced software is required to analyze an image captured by the camera, which increases the image processing load.

As such, in view of the above situation, the present invention aims to provide an input apparatus capable of accurately identifying a position of an instructing body in three-dimensional space with a simple structure and reduced processing load.

Solution to Problem

In order to solve the above-described problems, an input apparatus according to an aspect of the present invention includes: a light source that emits light toward a predetermined region; a first light-receiving unit that receives light reflected off a subject toward a first region and outputs a first detection signal; a second light-receiving unit that receives light reflected off the subject toward a second region in a direction substantially perpendicular to a direction from the predetermined region toward the first region, and outputs a second detection signal; and a control unit that determines a position of the subject using the first detection signal during a period for which the second light-receiving unit detects the reflected light.

With this, a position of the subject is determined using not the whole received-light data obtained by the first light-receiving unit receiving light, but the received-light data obtained by the first light-receiving unit receiving light at the same timing as the second light-receiving unit receives light, and therefore a position of the subject can be accurately identified with reduced processing load.

For example, the control unit may determine the position of the subject using received-light data obtained by the first light-receiving unit receiving light at the same timing as the second light-receiving unit receives reflected light of an amount exceeding a predetermined threshold.

For example, the input apparatus may further include: a display unit that displays an image; and an image-forming unit that projects a three-dimensional image to the predetermined region by forming in the predetermined region the image displayed by the display unit.

With this, it is possible to project a three-dimensional image to the predetermined region.

For example, it may be that the display unit includes display units, and the display units are aligned in a light emitted direction in which the light source emits light, and each display a display image crossing the light emitted direction.

With this, a three-dimensional image is displayed using the display units arranged along the direction in which the light source emits light, and therefore it is possible to show a user a three-dimensional image that has a depth in the direction in which the light is emitted.

For example, the predetermined region may include an image screen on which the image is formed by the image-forming unit.

For example, it may be that the second light-receiving unit includes second light-receiving units, and each of the second light-receiving units is provided at a position corresponding to a different one of the display units.

With this, it is sufficient that the processing of detecting a position of the subject is performed directly using the results of detection by the second light-receiving units, and therefore it is possible to omit the processing for matching the position of the three-dimensional image shown to a user with the position of the subject.

For example, the second light-receiving units may be disposed at positions that allow each of the second light-receiving units to detect light reflected, in a display region for a corresponding one of the display units, in a direction different from a direction of reflected light for another one of the display units.

With this, even the second light-receiving unit that is in the shadow to receive light from one side can receive reflected light from the other side in more cases, and thus the impact due to shadow can be reduced.

For example, it may be that the first light-receiving unit receives light reflected off the subject toward one side in the direction substantially perpendicular to the direction from the predetermined region toward the first region, and the second light-receiving unit receives light reflected off the subject toward the direction substantially perpendicular to the direction from the predetermined region toward the first region.

With this, the first light-receiving unit and the second light-receiving unit are capable of receiving the light emitted from the light source and reflected off the subject, and therefore it is possible to locate the subject with accuracy.

For example, the input apparatus may further include a projector that projects an image to the predetermined region.

With this, it is possible to project an image to the predetermined region.

An input apparatus according to another aspect of the present invention includes: a light source that emits detection light toward a first direction, and raster scans a detection interface with the detection light, the detection interface being defined in space; a first light sensor that is disposed closer to the light source than the detection interface, and detects first reflected light which is the detection light that has been reflected; a second light sensor that detects second reflected light which is the detection light that has been reflected off an instructing body that has entered a detection region extending from the detection interface toward the light source; and a control unit that detects a coordinate value of the instructing body using received-light data obtained by the first light sensor and the second light sensor receiving light at the same timing.

With this, the detection light is emitted to the detection interface, the first light sensor is disposed on the light source side, and the second light sensor is disposed at a position that allows the second light sensor to detect the second reflected light which is light that has been reflected off the instructing body that has entered the detection region. In other words, the first light sensor detects the first reflected light which is light reflected toward the light source among light beams reflected off the instructing body, and the second light sensor detects the second reflected light which is light reflected in the detection region. The control unit then detects a coordinate value of the instructing body using a sensor signal that is based on the first reflected light detected by the first light sensor at a timing when the second light sensor detects the second reflected light.

Thus, a coordinate value of the instructing body is detected using not the whole detection result for the first reflected light detected by the first light sensor, but the detection result for the first reflected light detected at a timing when the second light sensor detects the second reflected light (that is, a part of the detection result for the first reflected light), and therefore a coordinate value of the instructing body can be accurately identified with reduced processing load.

For example, it may be that the second light sensor includes second light sensors, the second light sensors are disposed at different positions in the first direction, and the control unit detects the coordinate value of the instructing body preferentially using, among second reflected light beams detected by the second light sensors, a second reflected light beam detected by, among the second light sensors, a second light sensor disposed close to the light source.

With this, a coordinate value of the instructing body is detected preferentially using the second reflected light detected by the second light sensor disposed close to the light source among the second reflected light beams. With the input apparatus, a user performs input from a position facing the light source. This means that in the input apparatus such as that described above, since the coordinate position of the tip of a finger of a user is necessary, for example, the first sensor signal obtained in a front area close to the user is unnecessary among the results obtained from the second light sensors. Thus, a priority is given to a coordinate value of a user's instruction point in a back area in the Z-axis direction (close to the light source) so that no processing is performed on unnecessary data detected in the front area close to the user, and therefore it is possible to minimize data of the first sensor signal that is subject to the process of detecting coordinates. Accordingly, the processing load related to the detecting process can be reduced.

For example, it may be that the input apparatus further include a projector that projects a mid-air image to the detection region, and the control unit changes the mid-air image projected by the projector, according to the detected coordinate value of the instructing body.

With this, a mid-air image is projected, and the projected mid-air image is changed according to a coordinate value of the instructing body, and therefore it is possible to give a user a sense of directly manipulating the mid-air image, for example.

For example, the projector may include: display units aligned in the first direction and each having a display surface crossing the first direction; and an image-forming unit that projects a three-dimensional image as the mid-air image to the detection region by forming in the detection region images displayed on the display units.

With this, the display units aligned in the first direction are used to display a three-dimensional image, and therefore it is possible to show a user the three-dimensional image that has a depth in the first direction.

For example, the second light sensors may be provided at respective positions corresponding to the display units.

With this, it is sufficient that the processing of detecting a coordinate value is performed directly using the results of detection by the second light sensors, and thus it is possible to omit the coordinate transformation process for matching the coordinates of the three-dimensional image shown to a user with the coordinates of the instructing body.

For example, the second light sensors may be aligned in the first direction.

For example, it may be that a part of the second light sensors is disposed to detect light reflected off the instructing body in a second direction extending along the detection interface, and a remaining part of the second light sensors is disposed to detect light reflected off the instructing body in a third direction different from the second direction extending along the detection interface.

With this, not only the second reflected light travelling in the second direction, but also the second reflected light travelling in the third direction can be detected, and therefore it is possible to detect the instructing body that has entered the detection region if there is reflected light travelling in at least one of the second direction and the third direction. Accordingly, even the second light-receiving unit that is in the shadow to receive light from one side can receive reflected light from the other side, and thus the impact due to shadow can be reduced.

For example, the light source may start the raster scan from an area of the detection interface that is on a side on which the second light sensor is provided.

With this, the light source starts the raster scan from the second light sensor side of the detection interfaces so that the raster scan on positions that will be in the shadows of the second light sensors is performed after positions that is less likely to be in the shadows. Accordingly, the result of the detection by the second light sensors can be reliably obtained.

Note that the present invention can not only be implemented as an input apparatus including characterizing processing units such as those described here, but as an input method in which the processes performed by the characterizing processing units included in the input apparatus are implemented as steps. Moreover, the present invention can be implemented as a computer program for making a computer perform as the characterizing processing units included in the input apparatus, or as a computer program that causes a computer to execute the characterizing steps included in the input method. It goes without saying that the computer program can be circulated on a non-transitory computer-readable recording medium such as a compact disc-read only memory (CD-ROM) or over a communications network such as the Internet.

Advantageous Effects

According the present invention, a position of an instructing body in three-dimensional space can be accurately identified with a simple structure and reduced processing load.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 9 is an illustration for use in describing a detection region of second light sensors in an input apparatus according to Embodiment 2.

DESCRIPTION OF EMBODIMENTS

Hereinafter, exemplary embodiments of the present invention are described in greater detail with reference to the accompanying Drawings. Note that each of the embodiments described below shows a specific example of the present invention. The numerical values, shapes, materials, structural elements, the arrangement and connection of the structural elements, steps, the processing order of the steps etc. shown in the following exemplary embodiments are mere examples, and therefore do not limit the present invention, the scope of which is defined in the appended Claims. As such, among the structural elements in the following embodiments, structural elements not recited in any one of the independent claims are described as structural elements of a preferable embodiment, and are not absolutely necessary in the present invention to solve the problems.

Embodiment 1

Embodiment 1 describes an input apparatus that detects user's virtual touch operation on a mid-air image projected in space.

Figure 1:
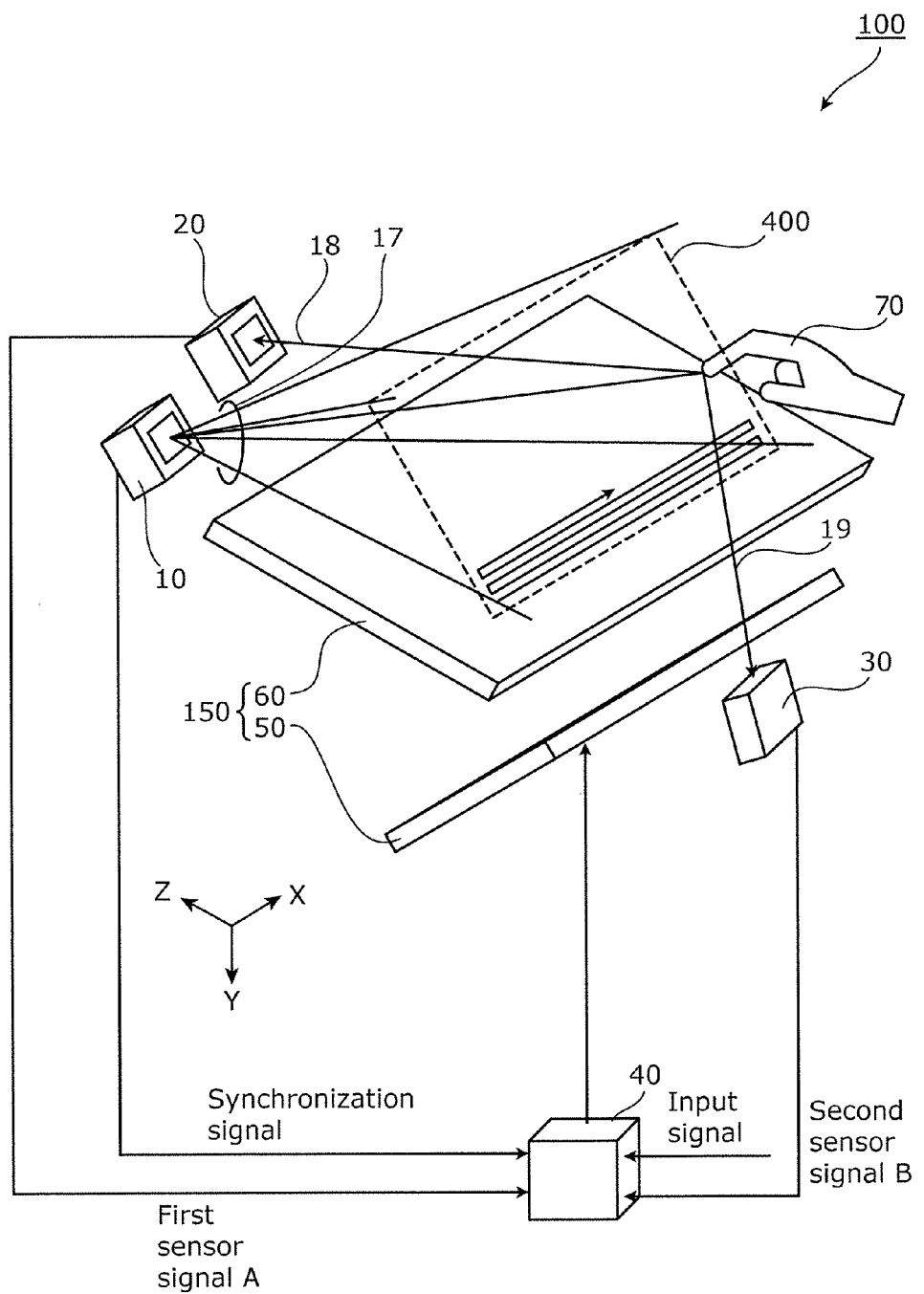
FIG. 1 schematically illustrates one example of a structure of an input apparatus according to Embodiment 1.
Figure 2:
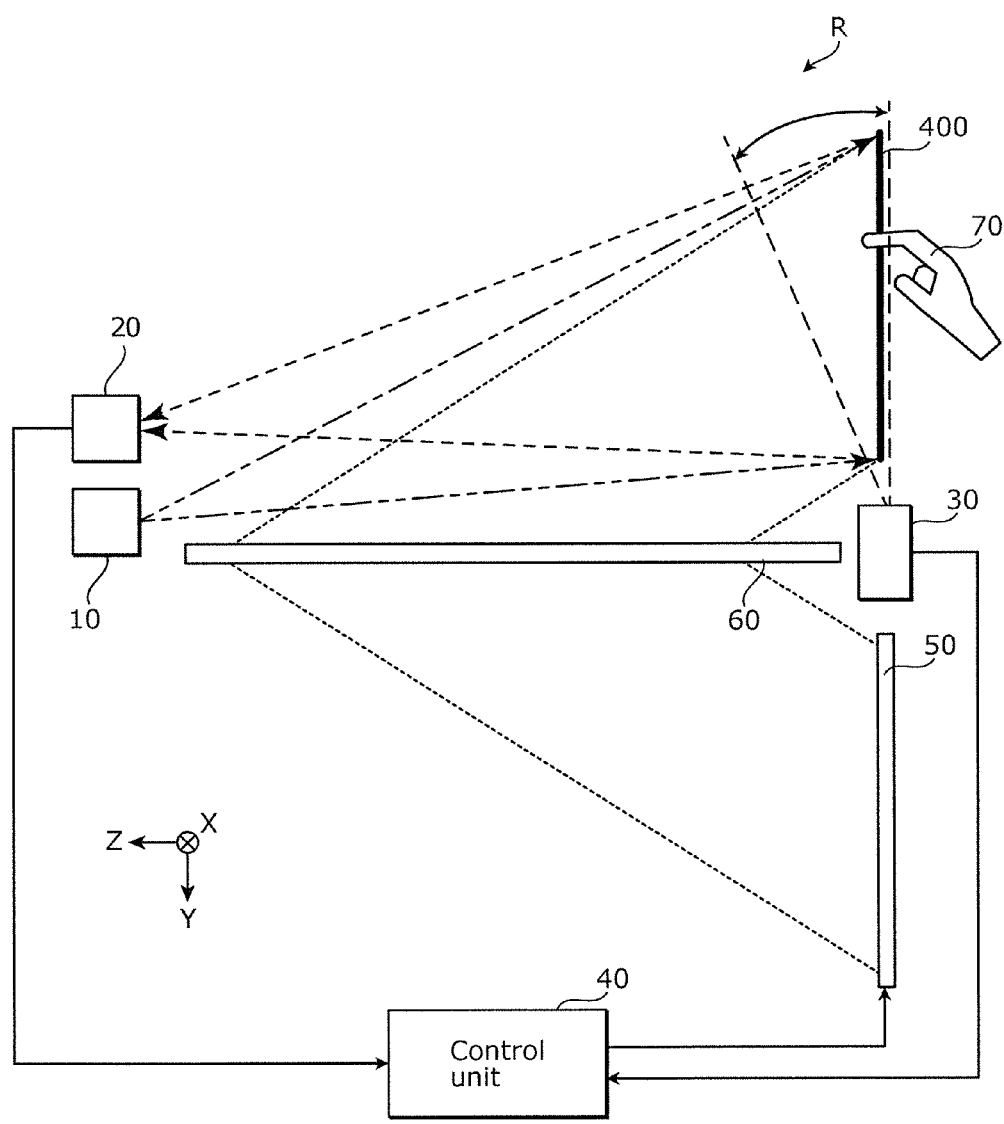
FIG. 2 is an illustration for use in describing a detection region of a second light sensor of an input apparatus.

FIG. 1 schematically illustrates one example of a structure of an input apparatus according to Embodiment 1. FIG. 2 is an illustration for use in describing a detection region of a second light sensor of the input apparatus.

As illustrated in FIG. 1, an input apparatus 100 includes a light source 10, a first light sensor 20, a second light sensor 30, a control unit 40, and a projector 150.

The light source 10 emits detection light 17 toward a first direction (Z-axis direction) and performs a detection light raster scan on a detection interface 400 defined in space. The light source 10 is a light source that emits light toward a detection region R which is the predetermined region. Note that, using the detection light 17, the light source 10 performs the raster scan on the detection interface 400 at a predetermined timing. The detection light 17 may be, for example, collimated infrared laser light.

The first light sensor 20 is disposed on the light source 10 side relative to the detection interface 400 and detects first reflected light 18 which is the detection light 17 that has been reflected. The first light sensor 20 is the first light-receiving unit that receives light reflected off an instructing body 70, which is the subject, toward the first region. The first light sensor 20 detects the first reflected light 18 at predetermined different timings, and outputs a first sensor signal A as the result of the detection.

The second light sensor 30 detects second reflected light 19 which is the detection light 17 that has been reflected off the instructing body 70 that has entered the detection region R extending from the detection interface 400 toward the light source 10. The second light sensor 30 is the second light-receiving unit that receives light reflected off the instructing body 70 toward the second region in a direction (the Y-axis direction) substantially perpendicular to a direction (the Z-axis direction) from the detection region R toward the first region. The second light sensor 30 detects the second reflected light 19 at predetermined different timings, and outputs a second sensor signal B as the result of the detection. The second light sensor 30 detects the second reflected light 19 which is light reflected in a detection region extending along the Y-axis direction that crosses a detection region for the first light sensor 20 that extends along the Z-axis direction. Furthermore, the second light sensor 30 detects light reflected along the Y-axis direction.

The instructing body 70 is, for example, a finger of a user or a pen in a user's hand that is moved. A virtual touch screen (not illustrated in the drawings) which the instructing body 70 virtually touches may be defined in the detection region R.

There is synchronization between the predetermined different timings at which the first light sensor 20 detects the first reflected light 18 and the predetermined different timings at which the second light sensor 30 detects the second reflected light 19. Furthermore, x-y coordinate values in the raster scan by the light source 10 are associated with the predetermined different timings at which the first light sensor 20 and the second light sensor 30 detect light. This means that when one of the predetermined different timings is identified, x-y coordinate values, on the detection interface 400, of the detection light 17 emitted from the light source 10 at such timing are identified.

The control unit 40 detects a coordinate value of the instructing body 70 using a sensor signal based on the first reflected light 18 detected by the first light sensor 20 during a period for which the second light sensor 30 detects the second reflected light 19. In other words, a position of the instructing body 70 is determined using the first sensor signal A and the second sensor signal B which are received-light data obtained by the first light sensor 20 and the second light sensor 30 receiving light at the same timing. Specifically, the control unit 40 determines a position of the instructing body 70 using received-light data obtained by the first light sensor 20 receiving light at the same timing as the second light sensor 30 receives reflected light of an amount exceeding a predetermined threshold.

Furthermore, according to the detected coordinate value of the instructing body 70, the control unit 40 changes the mid-air image projected by the projector 150. Specifically, the control unit 40 may display a pointer at a position of the mid-air image according to the detected coordinate value of the instructing body 70 to change the mid-air image, or may rotate, move, or deform the mid-air image according to input of a pointer to change the mid-air image.

The projector 150 includes a display unit 50 and an image-forming unit 60 and projects a mid-air image to the detection region R. The projector 150 projects an image to the detection region R.

The display unit 50 is, for example, a display panel on which an image is displayed. A display surface of the display unit 50 crosses the first direction. The display unit 50 may be a liquid-crystal display unit, for example. The image may be, for example, an image object with accurate three-dimensional features given through advanced shadow processing.

The image-forming unit 60 is an optical device panel that projects, as a mid-air image, an image displayed by the display unit 50, to the detection region R. In other words, the image-forming unit 60 projects a three-dimensional image to the detection region R by forming, in the detection region R, an image displayed by the display unit 50. The detection region R includes an image screen on which an image is formed by the image-forming unit 60. The image-forming unit 60 may be, for example, a dihedral corner reflector array disclosed in PTL 1. The image-forming unit 60 forms, in the detection region R, a mid-air image of a real image having a depth in the direction opposite to that of an original image. The control unit 40 defines a virtual touch screen having the same surface shape as that of the mid-air image so that a user can be given a virtual sense of touching the mid-air image.

Next, a functional structure of the input apparatus 100 is described.

Figure 3:
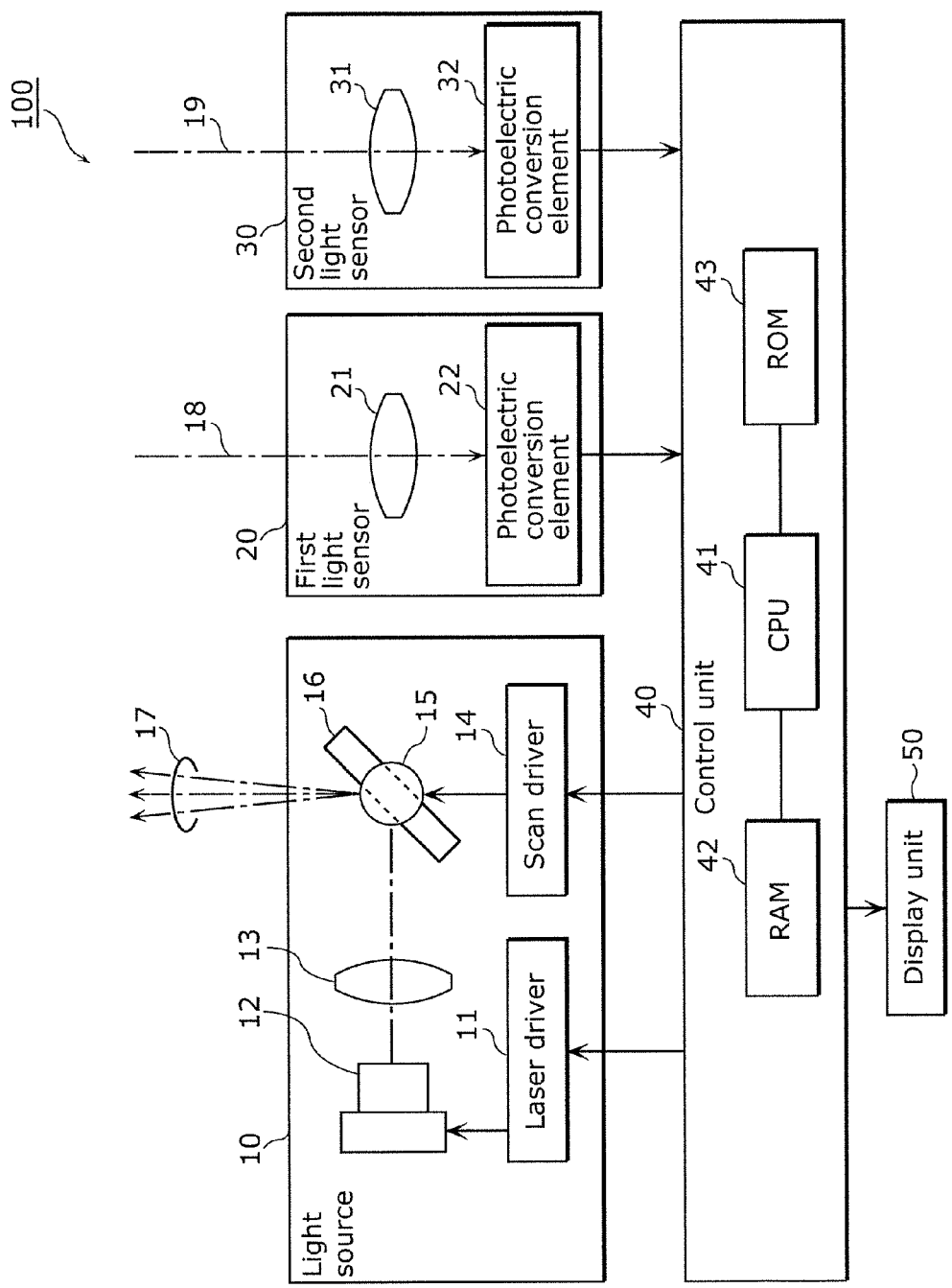
FIG. 3 is a block diagram illustrating one example of a functional structure of an input apparatus according to Embodiment 1.

FIG. 3 is a block diagram illustrating one example of a functional structure of an input apparatus according to Embodiment 1.

As illustrated in FIG. 3, the light source 10 includes a laser driver 11, an infrared laser device 12, a collimating lens 13, a scan driver 14, an actuator 15, and a mirror 16.

The laser driver 11 drives the infrared laser device 12 under the control of the control unit 40. The infrared laser device 12 emits infrared laser light as the detection light 17.

The collimating lens 13 converts into parallel light the incident infrared laser light emitted by the infrared laser device 12.

The scan driver 14 drives the actuator 15 under the control of the control unit 40. The actuator 15 changes a direction of the mirror 16, and raster scans the detection interface 400 with the detection light 17 reflected off the mirror 16. The raster scan by the detection interface 400 may include a primary raster scan in which the detection interface 400 is raster scanned in the X-axis direction with the detection light 17 and a secondary raster scan in which the detection interface 400 is raster scanned in the Y-axis direction with the detection light 17 as illustrated in FIG. 1.

The first light sensor 20 includes a condensing lens 21 and a photoelectric conversion element 22.

The condensing lens 21 collects the first reflected light 18 which is the detection light 17 reflected off the instructing body 70, and focuses the first reflected light 18 to the photoelectric conversion element 22. The photoelectric conversion element 22 converts into a sensor signal the first reflected light 18 incident on the photoelectric conversion element 22 after travelling from the condensing lens 21.

The second light sensor 30 includes a condensing lens 31 and a photoelectric conversion element 32.

The condensing lens 31 collects the second reflected light 19 which is the detection light 17 reflected off the instructing body 70, and focuses the second reflected light 19 to the photoelectric conversion element 32. The photoelectric conversion element 32 converts into a sensor signal the second reflected light 19 incident on the photoelectric conversion element 32 after travelling from the condensing lens 31.

The control unit 40 is a controller that holds information in which the above-described predetermined different timings (that is, timings of sampling) and the coordinate values in the raster scan with the detection light 17 are associated, and identifies a position of the instructing body 70. The control unit 40 reflects the result of identifying a position of the instructing body 70 in content that is displayed by the display unit 50.

The control unit 40 may be specifically a computer system configured from a central processing unit (CPU) 41, a random access memory (RAM) 42, and a read only memory (ROM) 43, for example. A portion or all of the functions of the control unit 40 may be achieved by the CPU 41 executing a program (not illustrated in the drawings) recorded on the ROM 43 with the use of the RAM 42 as a working memory. Moreover, a portion or all of the functions of the control unit 40 may be configured from a dedicated hardware circuit.

Next, a functional structure of the control unit 40 is described.

Figure 4:
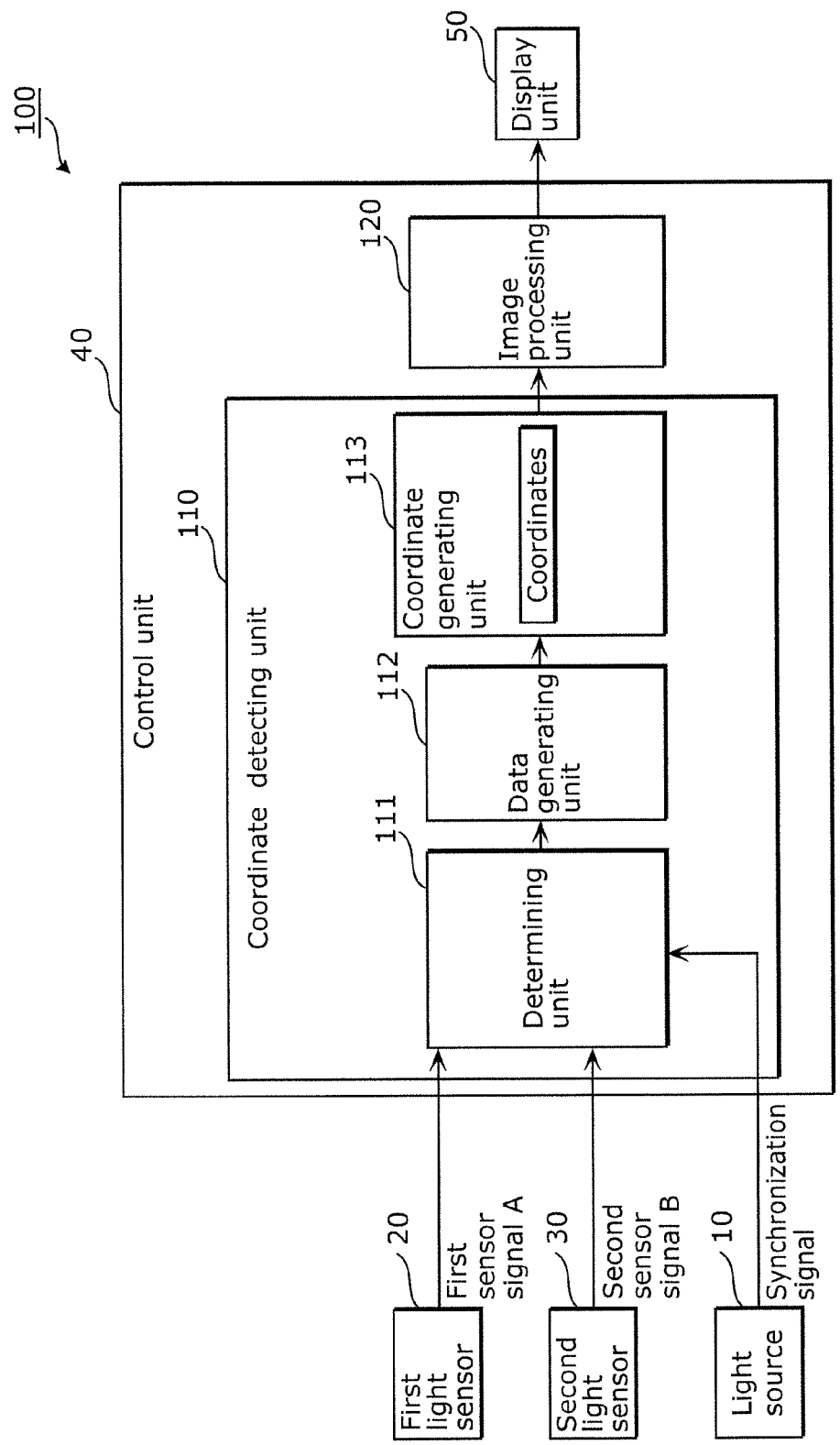
FIG. 4 is a block diagram illustrating one example of a functional structure of a control unit according to Embodiment 1.

FIG. 4 is a block diagram illustrating one example of a functional structure of a control unit according to Embodiment 1.

As illustrated in FIG. 4, the control unit 40 includes a coordinate detecting unit 110 and an image processing unit 120. The coordinate detecting unit 110 obtains the first sensor signal A from the first light sensor 20, the second sensor signal B from the second light sensor 30, and a synchronization signal for the raster scan by the light source 10, analyzes the obtained signals, and detects a coordinate value of the instructing body 70. The image processing unit 120 generates an image that is to be displayed by the display unit 50, based on the coordinate value of the instructing body 70 obtained by the coordinate detecting unit 110.

The coordinate detecting unit 110 includes a determining unit 111, a data generating unit 112, and a coordinate generating unit 113.

The determining unit 111 obtains the first sensor signal A from the first light sensor 20, the second sensor signal from the second light sensor 30, and the synchronization signal for the raster scan by the light source 10. The determining unit 111 determines, for each of the sensor signals obtained at different timings, whether or not the second sensor signal B exceeds a predetermined threshold. When the determining unit 111 determines that the second sensor signal B exceeds the predetermined threshold, the determining unit 111 identifies, among the first sensor signals A detected at the different timings, the first sensor signal A detected at a detection timing that is a timing at which the second sensor signal B that exceeds the predetermined threshold is detected.

The data generating unit 112 generates instructing body data representing the shape, size, peak intensity, and instructed coordinates of the instructing body 70, using the first sensor signal A detected at the detection timing and identified by the determining unit 111. The instructing body data includes coordinates representing a position of a tip of the instructing body 70. Note that the coordinates included in the instructing body data are not limited to the coordinates representing the position of the tip of the instructing body 70 and may be previously determined coordinates that represent a reference position on the instructing body 70.

The coordinate generating unit 113 outputs coordinates representing the position of the tip of the instructing body 70 based on the instructing body data generated by the data generating unit 112.

Figure 5A:
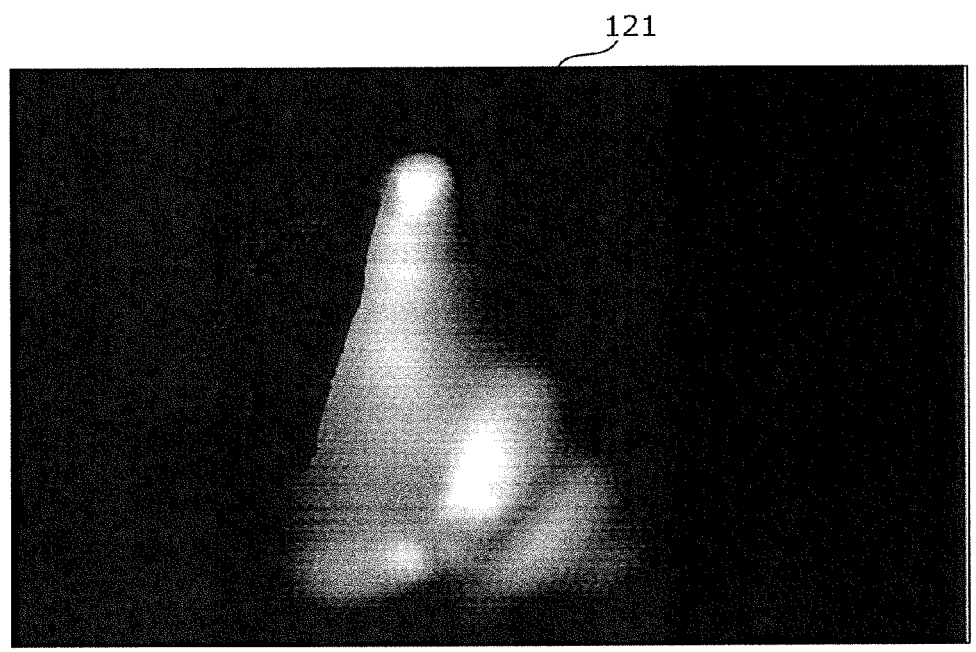
FIG. 5A is an image obtained by converting a first sensor signal A in one raster scan.
Figure 5B:
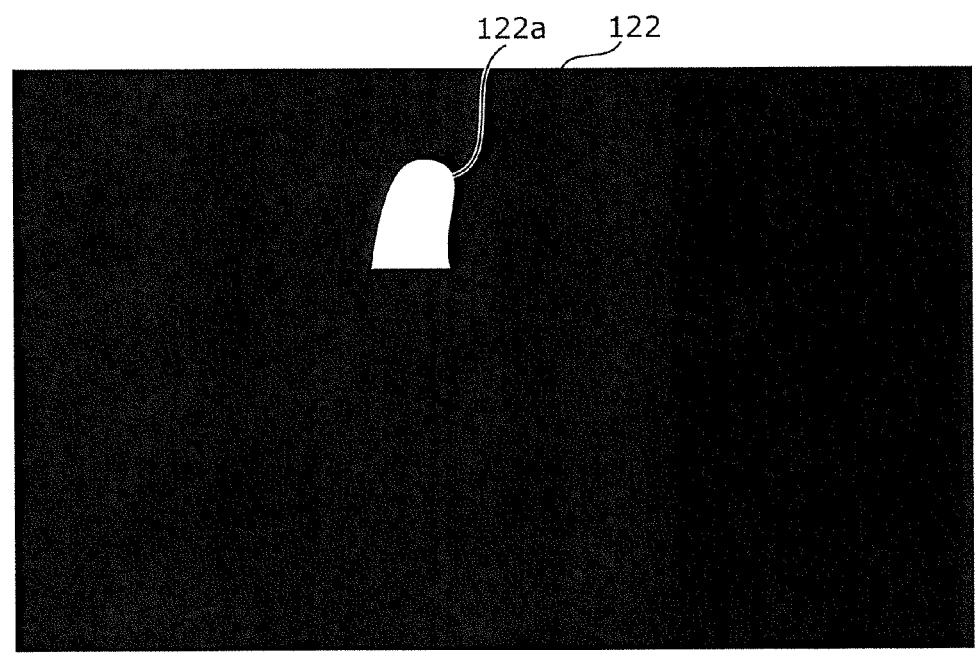
FIG. 5B is an image obtained by converting a second sensor signal B that exceeds a predetermined threshold among second sensor signals B in one raster scan.
Figure 5C:
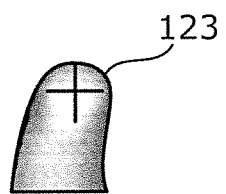
FIG. 5C is an image obtained by converting a first sensor signal A detected at a detection timing.

FIG. 5A is an image obtained by converting the first sensor signal A in one raster scan. FIG. 5B is an image obtained by converting the second sensor signal B that exceeds the predetermined threshold among the second sensor signals B in one raster scan. FIG. 5C is an image obtained by converting the first sensor signal A detected at a detection timing. Herein, "one raster scan" is raster scanning of an entire region of the detection interface 400 one time.

As illustrated in FIG. 5A, the first sensor signal A obtained by the first light sensor 20 in one raster scan is represented as a first image 121. The first image 121 is whiter where the first sensor signal has a larger detection value, and is blacker where the first sensor signal has a smaller detection value. This means that the first reflected light 18 which is light reflected off the instructing body 70 with higher reflection intensity is drawn in a whiter color in the first image 121.

As illustrated in FIG. 5B, the second sensor signal B obtained by the second light sensor 30 in one raster scan is represented as a second image 122. The second image 122 shows whether or not the second sensor signal B exceeds the predetermined threshold, thus representing two values in black and white. In detail, the second image 122 is white where the second sensor signal B exceeds the predetermined threshold, and is black where the second sensor signal B is less than or equal to the predetermined threshold. Therefore, the use of the second image 122 makes it possible to identify a specific region 122a represented by the second sensor signal B that exceeds the predetermined threshold.

The first image 121 and the second image 122 respectively represent the first sensor signal A and the second sensor signal B obtained during one raster scan. Specifically, the first image 121 is represented by detection values of the first sensor signals A detected at the predetermined different timings, and respective coordinate values identified based on the timings. The second image 122 is represented by the result of the determination on whether or not the detection values of the second sensor signal B detected at the predetermined different timings exceed the predetermined threshold, and the respective coordinate values identified based on the timings.

Subsequently, only the specific region 122a of FIG. 5B is clipped from the first image 121 of FIG. 5A to obtain a clipped image 123, and thus it is possible to obtain an image converted from the first sensor signal A detected at the detection timing. In this way, the control unit 40 is capable of obtaining the clipped image 123 from the first sensor signal A and the second sensor signal B obtained in one raster scan, and performs image processing on the clipped image 123, thereby generating the instructing body data representing the shape, size, peak intensity, and instructed coordinates of the instructing body 70. Therefore, as compared to the case where only the first sensor signal A is used to generate instructing body data, the image processing for generating instructing body data is performed on the clipped image 123 that is smaller, with the result that the processing load to detect a coordinate value of the tip of the instructing body 70 is lower.

The image processing is for detecting a region having the highest peak intensity in the image obtained as the sensor signal. Alternatively, the image processing is for detecting a region having a value exceeding a predetermined threshold in the image obtained as the sensor signal. Alternatively, the image processing is for detecting, as a coordinate value of the instructing body, a reference point in the region having high peak intensity or in the region having a value exceeding a predetermined threshold.

Next, operation of the control unit 40 is described.

Figure 6:
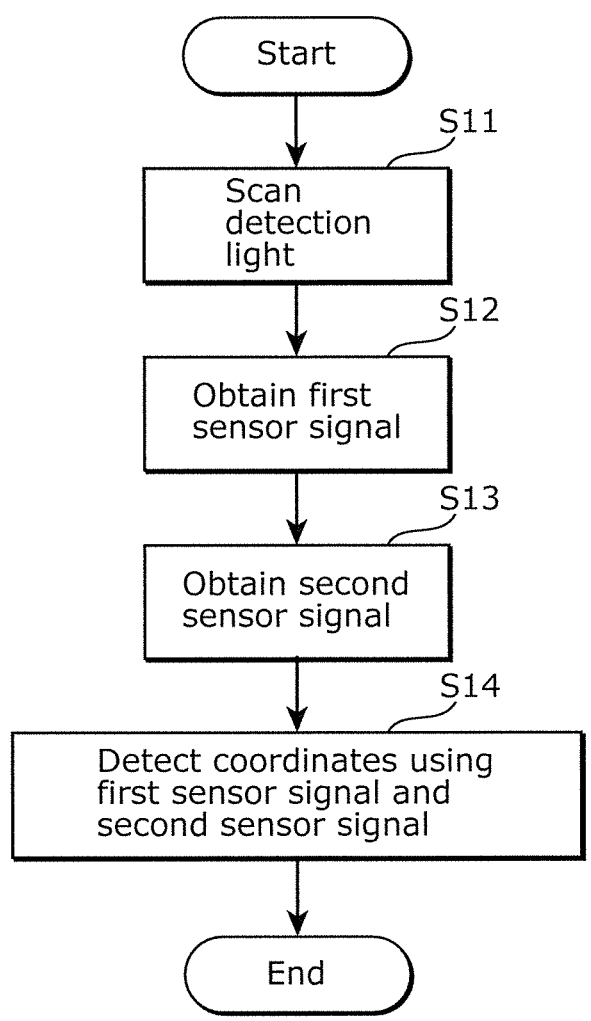
FIG. 6 is a flowchart illustrating a detecting process in which a coordinate value of an instructing body is detected.

FIG. 6 is a flowchart illustrating a detecting process in which a coordinate value of the instructing body is detected.

In the detecting process, first, the control unit 40 causes the light source 10 to emit the detection light 17, and raster scans the detection interface 400 with the detection light 17 (S11).

Next, the control unit 40 obtains the first sensor signal A detected by the first light sensor 20 (S12).

Furthermore, the control unit 40 obtains the second sensor signal B detected by the second light sensor 30 (S13).

The control unit 40 detects a coordinate value of the instructing body 70 using the first sensor signal A and the second sensor signal B (S14). In detail, the control unit 40 detects a coordinate value of the instructing body 70 using a sensor signal based on the first reflected light 18 detected by the first light sensor 20 at a timing when the second light sensor 30 detects the second reflected light 19. Specifically, the control unit 40 determines whether or not the second reflected light 19 has been detected. Specifically, the control unit 40 uses the determining unit 111 to determine whether or not the second sensor signal B detected by the second light sensor 30 exceeds the predetermined threshold, thereby determining whether or not the second reflected light 19 has been detected. The control unit 40 then detects a coordinate value using the first sensor signal A of when it is determined that the second reflected light 19 has been detected.

In the input device 100 according to Embodiment 1, the detection light 17 is emitted toward the detection interface 400, the first light sensor 20 is disposed on the light source 10 side, and the second light sensor 30 is disposed at a position that allows the second light sensor 30 to detect the second reflected light 19 which is light that has been reflected off the instructing body 70 that has entered the detection region R. In other words, the first light sensor 20 detects the first reflected light 18 which is light reflected toward the light source 10 among light beams reflected off the instructing body 70, and the second light sensor 30 detects the second reflected light 19 which is light reflected in the detection region R which is a limited region of the detection region for light to be detected by the first light sensor 20. The control unit 40 then detects a coordinate value of the instructing body 70 using a sensor signal that is based on the first reflected light 18 detected by the first light sensor 20 at a timing when the second light sensor 30 detects the second reflected light 19.

Thus, a coordinate value of the instructing body 70 is detected using not the whole detection result for the first reflected light 18 detected by the first light sensor 20, but the detection result for the first reflected light 18 detected at a timing when the second light sensor 30 detects the second reflected light 19 (that is, a part of the detection result for the first reflected light 18), and therefore a coordinate value of the instructing body can be accurately identified with reduced processing load. Furthermore, a position of the instructing body 70 in the depth direction (the Z-axis direction) can be detected by the second light sensor 30, and since a coordinate value of the instructing body is detected using the first sensor signal A detected at the detection timing of the second light sensor 30, the first sensor signal A from the instructing body 70 located outside of the detection region R of the second light sensor 30 is not used in the processing of detecting a coordinate value. In other words, a coordinate value of a part of the instructing body 70 is identified, the coordinate value of which is necessary, that is, which is included in the detection region R, among parts of the instructing body 70, and therefore it is possible to reduce the detection error of the first sensor signal A.

According to the input apparatus 100 according to Embodiment 1, a mid-air image is projected, and the projected mid-air image is changed according to a coordinate value of the instructing body 70, and therefore it is possible to give a user a sense of directly manipulating the mid-air image, for example.

Embodiment 2

Next, an input apparatus 100a according to Embodiment 2 is described.

Figure 7:
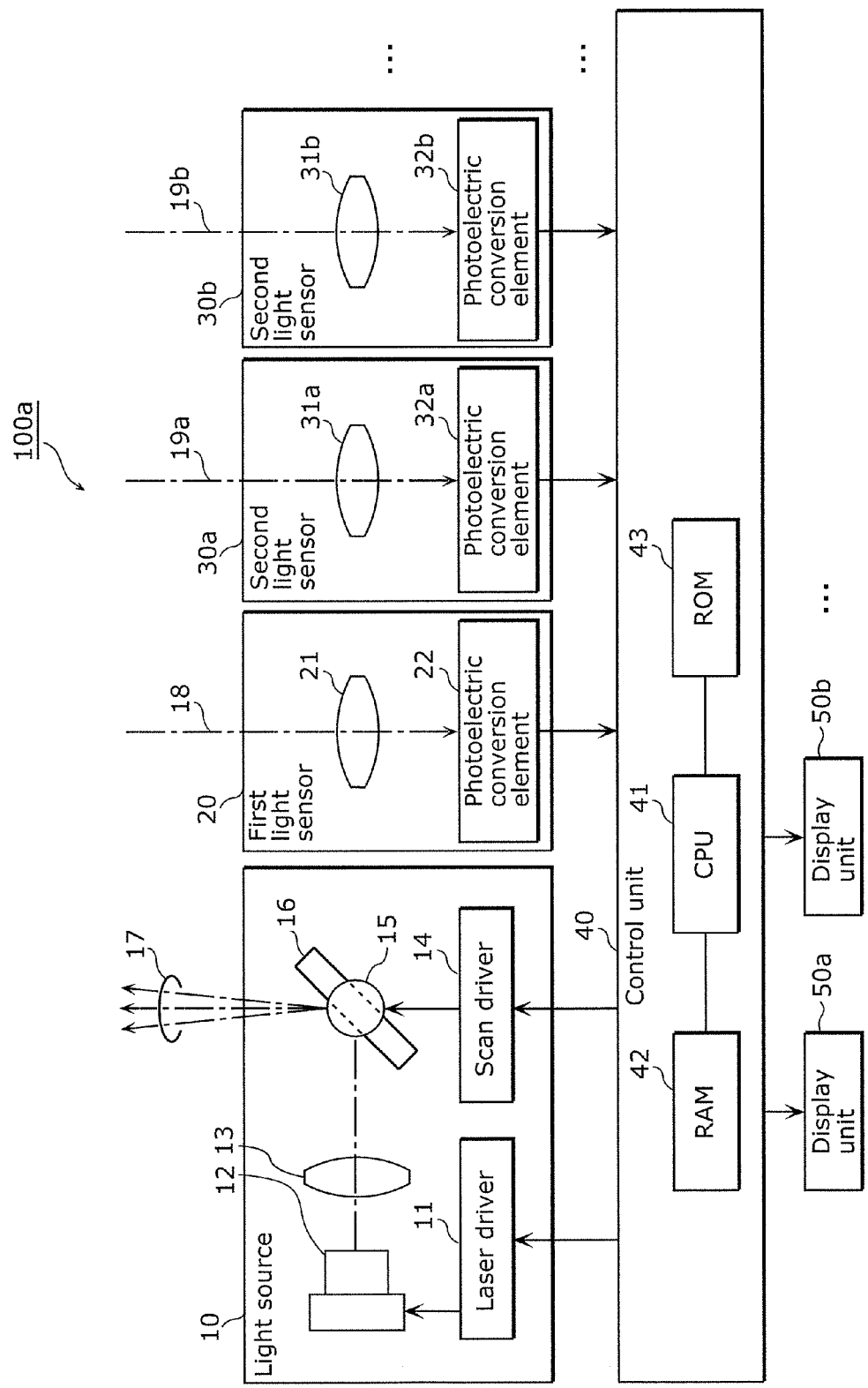
FIG. 7 schematically illustrates one example of a functional structure of an input apparatus according to Embodiment 2.
Figure 8:
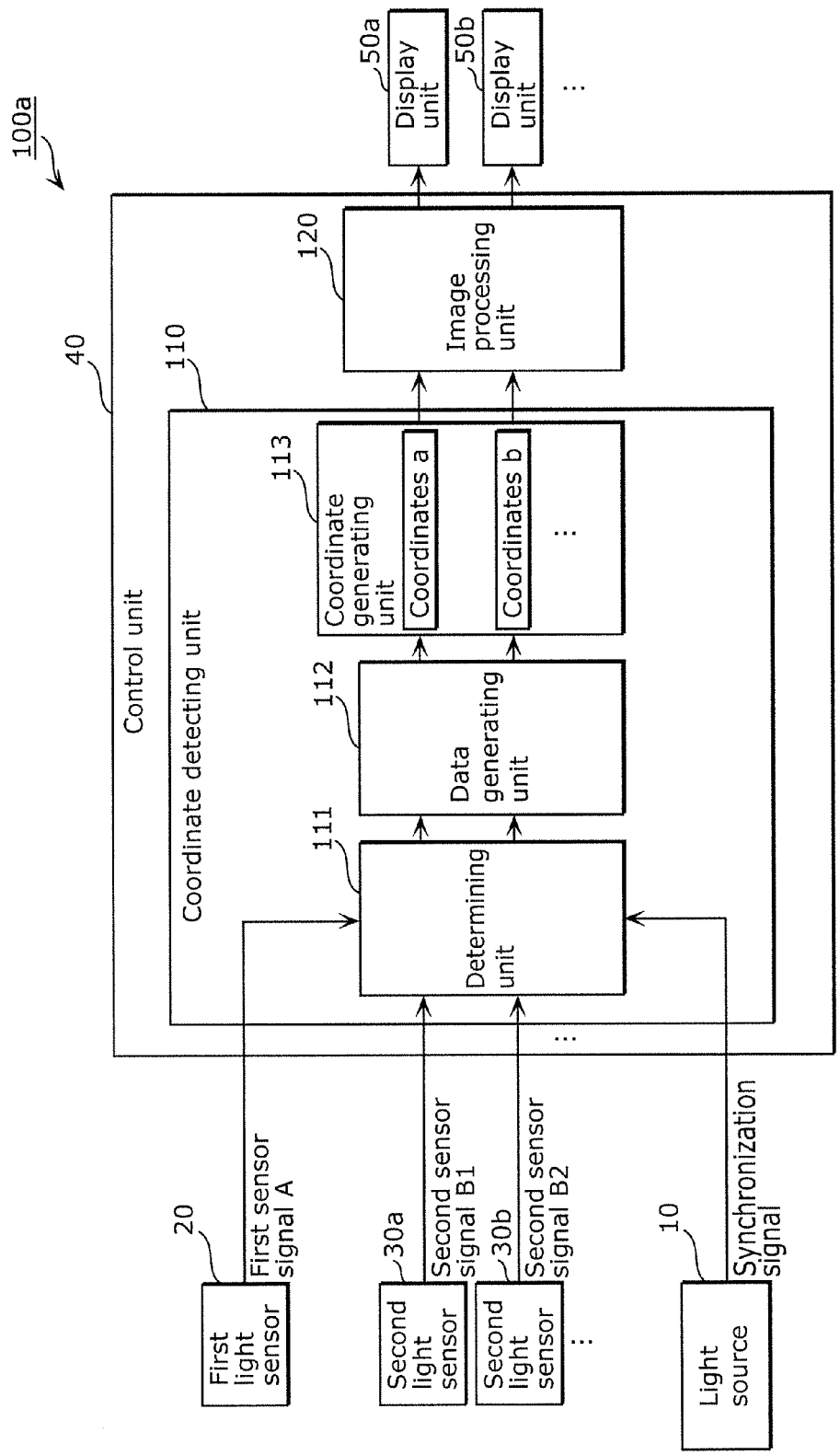
FIG. 8 is a block diagram illustrating one example of a functional structure of a control unit according to Embodiment 2.

FIG. 7 is a block diagram illustrating one example of a functional structure of an input apparatus according to Embodiment 2. FIG. 8 is a block diagram illustrating one example of a functional structure of a control unit according to Embodiment 2. FIG. 9 is an illustration for use in describing a detection region of second light sensors in the input apparatus according to Embodiment 2.

An input apparatus 100a according to Embodiment 2 is different from the input apparatus 100 according to Embodiment 1 in that the input apparatus 100a includes second light sensors 30a, 30b, . . . , and display units 50a, 50b, . . . . Furthermore, the control unit 40 according to Embodiment 2 is different from that according to Embodiment 1 in that the control unit 40 according to Embodiment 2 obtains the second sensor signals B1, B2, . . . , obtained by the second light sensors 30a, 30b, . . . , and performs the processing of detecting a coordinate value of the instructing body 70 using the obtained second sensor signals B1, B2, . . . , and in that the control unit 40 according to Embodiment 2 outputs images to the display units 50a, 50b, . . . , according to the detected coordinate value of the instructing body 70. The other structural elements are the same or similar as those according to Embodiment 1 and therefore denoted by the same reference signs, and descriptions thereof are omitted.

The second light sensors 30a, 30b, . . . , are disposed at different positions in the first direction (the Z-axis direction). In other words, the second light sensors 30a, 30b, . . . , are aligned in the Z-axis direction. For the second light sensors 30a, 30b, 30c, . . . , detection interfaces 401, 402, and 403 are defined respectively as illustrated in FIG. 9. The detection interface 401 closest to a user is defined as a first layer, and detection interfaces farther from the user than the first layer are defined as a second layer, a third layer, . . . , in sequence from one close to the user. Specifically, the detection interface 402 is defined as the second layer, and the detection interface 403 is defined as the third layer. The second light sensors 30a, 30b, and 30c detect the second reflected light which is light reflected off the instructing body 70 that has entered detection regions R1, R2, and R3, respectively, provided on the light source 10 side relative to the detection interfaces 401, 402, and 403.

The control unit 40 detects a coordinate value of the instructing body 70 preferentially using the second reflected light detected by the second light sensor disposed close to the light source 10 among the second reflected light beams detected by the second light sensors 30a, 30b, . . . . Specifically, for example, when the second reflected light is detected by the second light sensor 30a and the second light sensor 30b, a coordinate value of the instructing body 70 is detected preferentially using the result of the detection by the second light sensor 30b disposed closer to the light source 10 (farther from a user).

Figure 10A:
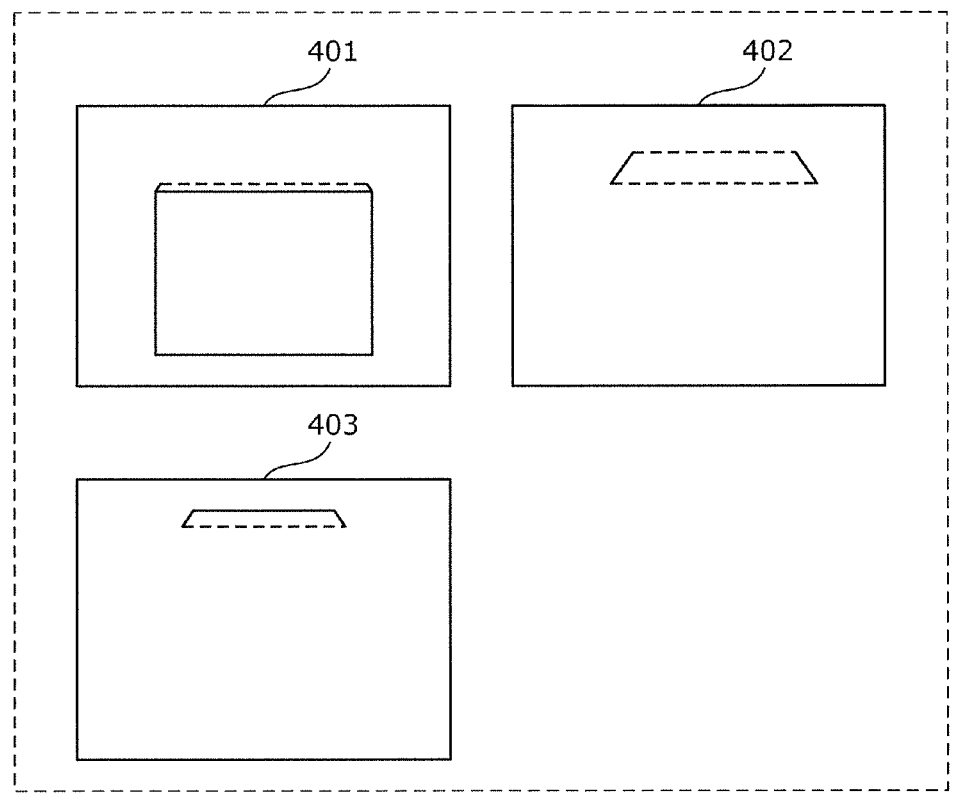
FIG. 10A is an illustration for use in describing mid-air images that are formed based on images displayed on respective display units.

The display units 50a, 50b, 50c, . . . , are disposed each having a display surface crossing the Z-axis direction, and are aligned in the Z-axis direction. In other words, the display units 50a, 50b, 50c, . . . , are aligned in a light emitted direction in which the light source 10 emits light, and each display a display image crossing the light emitted direction. The image-forming unit 60 projects three-dimensional images as mid-air images to the detection regions R1, R2, R3, . . . , by forming, in the detection regions R1, R2, R3, . . . , images displayed on the display units 50a, 50b, . . . (FIG. 10A). As illustrated in FIG. 10A, the most front part of a solid is displayed on the display unit 50a closest to a user, and a part of the solid farther from the user is displayed on the display unit farther from the user. Consequently, the mid-air images are combined so that a three-dimensional image having a depth (FIG. 10B) becomes visible to the user.

Figure 10B:
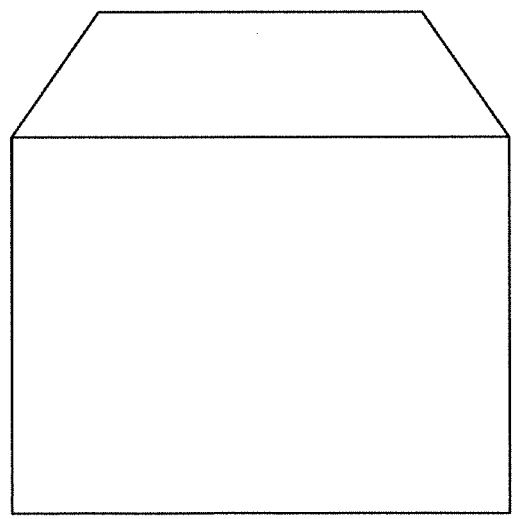
FIG. 10B is an illustration for use in describing a three-dimensional image that becomes visible to a user as a result of combination of mid-air images.

FIG. 10A is an illustration for use in describing mid-air images that are formed based on images displayed on the respective display units 50a, 50b, 50c, . . . according to images displayed on the detection interfaces 401, 402, and 403. FIG. 10B is an illustration for use in describing a three-dimensional image that becomes visible to a user as a result of combination of mid-air images.

As illustrated in FIG. 9, the second light sensors 30a, 30b, 30c, . . . , and the display units 50a, 50b, 50c, . . . , are provided at mutually corresponding positions. Specifically, the positions of the second light sensor 30a and the display unit 50a in the Z-axis direction correspond to each other, the positions of the second light sensor 30b and the display unit 50b in the Z-axis direction correspond to each other, and the positions of the second light sensor 30c and the display unit 50c in the Z-axis direction correspond to each other.

Also in the input apparatus 100a according to Embodiment 2, a detecting process such as that described in Embodiment 1 is performed.

Figure 11:
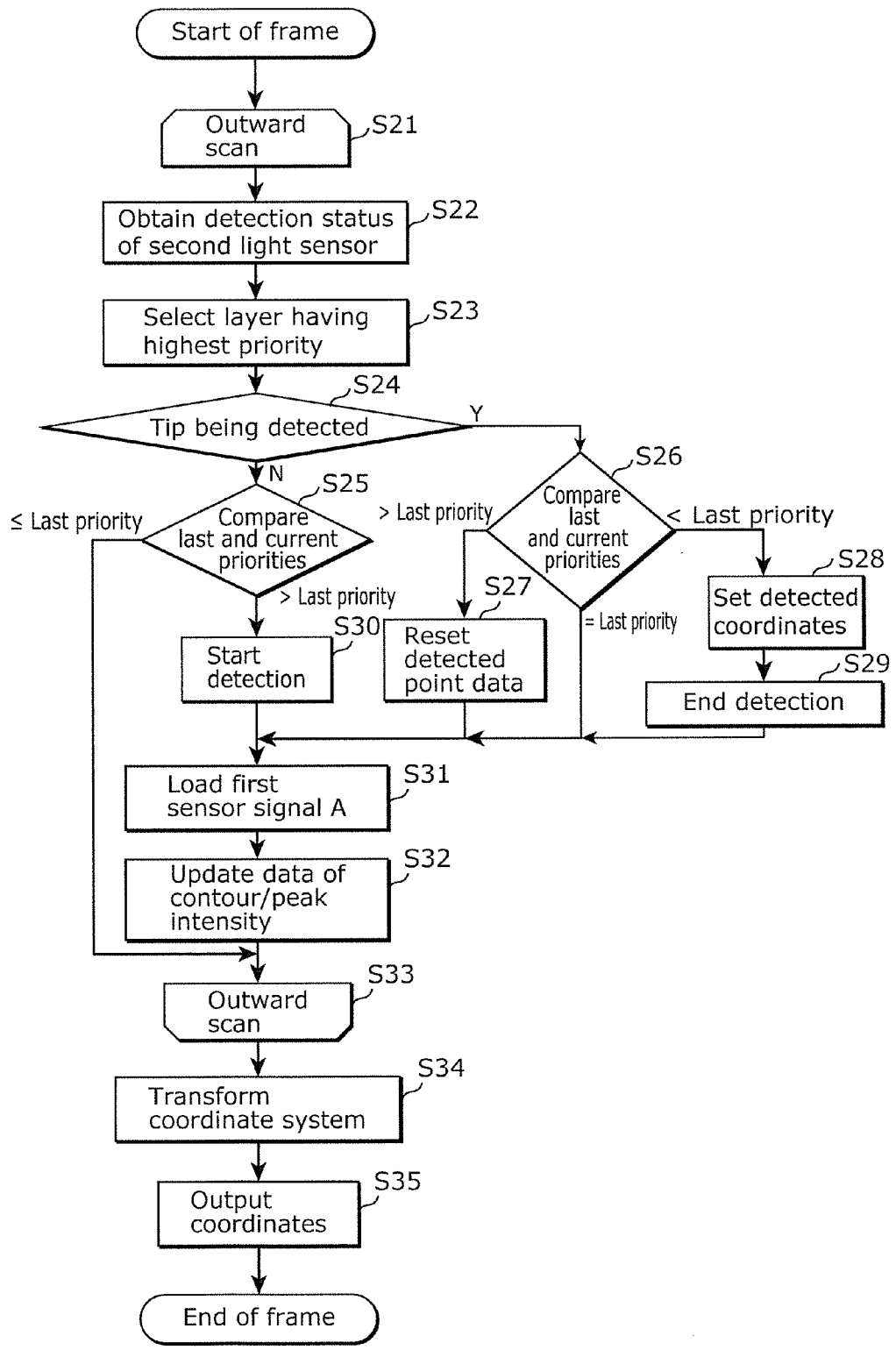
FIG. 11 is a flowchart for use in describing a specific example of a detecting process that is performed in an input apparatus according to Embodiment 2.

FIG. 11 is a flowchart for use in describing a specific example of the detecting process that is performed in the input apparatus according to Embodiment 2.

First, the detecting process by the light source 10 performing one raster scan in the X-axis direction starts (S21). The following describes one raster scan in the X-axis direction among raster scans in the X-axis direction that are performed in one raster scan. At this time, the first sensor signal A is obtained as the result of the detection by the first light sensor 20 at predetermined different timings even during one raster scan in the X-axis direction. Processes in Step S21 to Step S33 are sequentially performed on the respective sensor signals detected at the predetermined different timings during one raster scan in the X-axis direction.

First, a detection status of the second light sensors 30a, 30b, . . . , is obtained (S22).

Among the detection results of the second light sensors 30a, 30b, . . . , the second light sensor that has the highest priority (that is, closest to the light source 10) in the detection results that exceed a predetermined threshold is selected (S23).

Next, it is determined whether or not a current signal is a signal that is detecting a tip of the instructing body 70 among the first sensor signals detected at the predetermined different timings (S24).

Figure 12:
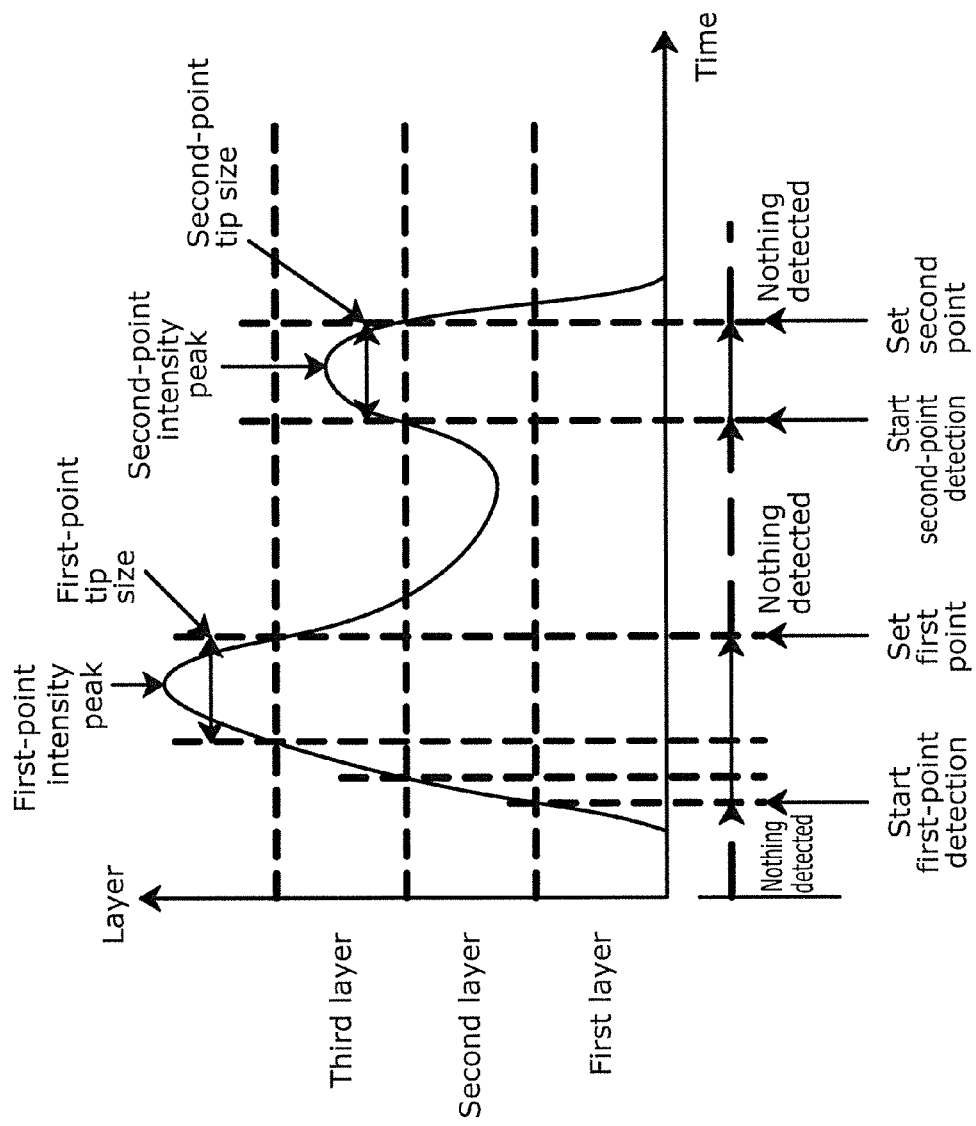
FIG. 12 is an illustration related to a first sensor signal, for use in describing a process of detecting a tip of an instructing body.

FIG. 12 is an illustration related to the first sensor signal, for use in describing the process of detecting the tip of the instructing body. FIG. 12 is a graph representing values of the first sensor signal A obtained by the first light sensor 20 in one raster scan in the X-axis direction. In detail, although the first sensor signal A is represented as a continuous curve in FIG. 12, the continuous curve is actually made up of discretely plotted dots representing the first sensor signals A obtained at the predetermined different timings. In short, the curve in the graph of FIG. 12 is obtained by curve approximation of the discretely plotted dots.

In Step S24, it is determined from the graph whether or not the following condition is satisfied: the instructing body 70 is detected at the first or higher layer, and the slope of this curve in the graph is positive, and when this condition is satisfied, the process transitions to the phase in which the tip is being detected. When the curve falls by one step from a higher layer to a lower layer among the layers while the tip is being detected, it is determined that the tip of the instructing body 70 is not being detected.

When it is determined that the tip of the instructing body 70 is not being detected (No in S24), the priority at the current timing and the priority at the last timing are compared (S25). The priority herein is defined by the position of, among the second light sensors 30a, 30b, . . . , the second light sensor that is closest to the light source 10 when detecting the second reflected light. This means that specifically, the second layer has a higher priority than the first layer.

When it is determined that the current priority is higher than the last priority, detection of a coordinate value using the first sensor signal A detected at the current timing starts (S30).

When it is determined that the tip of the instructing body 70 is being detected (Yes in S24), the priority at the current timing and the priority at the last timing are compared (S26). The process in Step S26 is the same or similar as the process in Step S25.

When it is determined in Step S26 that the current priority is higher than the last priority, detected point data is reset (S27). Specifically, the first sensor signal A loaded on and before the last detection is deleted.

When it is determined in Step S26 that the current priority is the same as the last priority, the processing proceeds to the next Step S31.

When it is determined in Step S26 that the current priority is lower than the last priority, the coordinates detected using data detected on and before the last detection are set (S28). Specifically, for example, when the last priority is the third layer and the current priority is the second layer, the detected coordinates are set using data that has priorities up to the third layer and is detected on and before the last detection, and the processing is ended (S29).

When Step S30, S27 or S29 is ended or when it is determined in Step S26 that the current priority is the same as the last priority, loading of the first sensor signal A is started (S31).

Subsequently, data of at least one of the contour and the peak intensity of the instructing body 70 is calculated using the first sensor signal A (S32).

Next, when Step S32 is ended or when it is determined in Step S25 that the current priority is lower than the last priority, the detecting process by one raster scan in the X-axis direction is ended (S33), and the detecting process by one raster scan in the X-axis direction for the next row in the Y-axis direction is performed, which is repeated from Step S21 until there is no longer next row in the Y-axis direction.

When the processes in Step S21 to Step S33 are ended for all the raster scans in the X-axis direction, the coordinate system of the obtained coordinate data is transformed (S34). Specifically, since the range of the raster scan by the light source 10 with the detection light 17 is different for each of the detection interfaces 401, 402, 403, . . . , the coordinate systems of the coordinate data obtained on the detection interfaces 401, 402, 403, . . . , are transformed into a single coordinate system.

Lastly, the coordinate values after the transformation are output, and the processing is ended (S35).

Note that the processes in Step S21 to Step S35 are for obtaining one frame of one image subject to the raster scan, and are supposed to be performed sequentially for frames thereof, meaning that once Step S35 is ended, the processing returns to Step S21 to repeat the processes.

The input apparatus 100a according to Embodiment 2 detects a coordinate value of the instructing body 70 preferentially using the second reflected light detected by the second light sensor disposed close to the light source 10 among the second reflected light beams. With the input apparatus 100a, a user performs input from a position facing the light source 10. This means that in the input apparatus 100a such as that described above, for example, since the coordinate position of the tip of a finger of a user is necessary, the first sensor signal A obtained in a front area close to the user is unnecessary among the results obtained from the second light sensors 30a, 30b, 30c, . . . . Thus, a priority is given to a coordinate value of a user's instruction point in a back area in the Z-axis direction (close to the light source 10) so that no processing is performed on unnecessary data detected in the front area close to the user, and therefore it is possible to minimize data of the first sensor signal A that is subject to the process of detecting coordinates. Accordingly, the processing load related to the detecting process can be reduced.

In the input apparatus 100a according to Embodiment 2, the light source 10 starts the raster scan from the second light sensors 30a, 30b, 30c, . . . , side of the detection interfaces 401, 402, 403, . . . , so that the raster scan on positions that will be in the shadows of the second light sensors 30a, 30b, 30c, . . . , is performed after positions that are less likely to be in the shadows. With this, the result of the detection by the second light sensors 30a, 30b, 30c, . . . , can be reliably obtained.

Furthermore, in the input apparatus 100a according to Embodiment 2, the display units 50a, 50b, 50c, . . . , aligned in the Z-axis direction are used to display a three-dimensional image, and therefore it is possible to show a user the three-dimensional image that has a depth in the Z-axis direction.

Furthermore, in the input apparatus 100a according to Embodiment 2, the second light sensors 30a, 30b, 30c, . . . , are disposed at positions corresponding to the display units 50a, 50b, 50c, . . . , and therefore it is sufficient that the processing of detecting a coordinate value is performed directly using the results of the detection by the second light sensors 30a, 30b, 30c, . . . . Consequently, it is possible to omit the coordinate transformation process for matching the coordinates of the three-dimensional image shown to a user with the coordinates of the instructing body.

Other Embodiments

The input apparatus according to embodiments of the present invention has hereinbefore been described, but the present invention is not limited to these embodiments.

For example, in the input apparatuses 100 and 100a according to the above-described embodiments, the second light sensors 30, 30a, 30b, 30c, . . . , are disposed on the positive side of the Y-axis relative to the respective detection regions R, R1, R2, R3, . . . , but the positions of the second light sensors 30, 30a, 30b, 30c, . . . , are not limited to such positions on the positive side of the Y-axis and may be on the negative side of the Y-axis, or on the positive side of the X-axis, or on the negative side of the X-axis. In short, the position of the second light sensor is not limited to a position on the positive side of the Y-axis as long as it is located in an area in a direction substantially perpendicular to the Z-axis direction relative to the corresponding detection region.

Furthermore, for example, in the input apparatuses 100 and 100a according to the above-described embodiments, the detection regions R, R1, R2, R3, . . . , of the second light sensors 30, 30a, 30b, 30c, . . . , further expand with increasing distances from the second light sensors 30, 30a, 30b, 30c, . . . , as illustrated in FIG. 2 and FIG. 9, but this is not the only example. For example, the detection region of the second light sensor may be a detection region parallel to the Y-axis direction, which has the same width regardless of how close to or how far from the second light sensor.

Furthermore, for example, in the input apparatus 100a according to the above-described Embodiment 2, the second light sensors 30a, 30b, 30c, . . . , are aligned in a row along the Z-axis direction, but this is not the only example, and it may be that a part of the second light sensors is disposed to detect light reflected off the instructing body in the second direction extending along the detection interface, and a remaining part of the second light sensors is disposed to detect light reflected off the instructing body in the third direction different from the second direction extending along the detection interface. In other words, one of the second light sensors may be disposed at such a position that the second light sensor detects light reflected, in a display region (the detection interface) for the display unit corresponding to the second light sensor, in a direction different from a direction of reflected light for another display unit that does not correspond to the second light sensor.

Specifically, one of the second light sensors is positioned closer to the Y-axis direction than the detection region R1, and another one of the second light sensors is positioned closer to the X-axis direction than the detection region R2.

Furthermore, for example, although not particularly mentioned in the above-described embodiments, it may be that the first light sensor receives light reflected off the instructing body toward one side in the Y-axis direction and the second light sensor receives light reflected off the instructing body toward the Y-axis direction. Thus, it is preferred that the first light sensor be disposed at such a position that the first light sensor can receive light reflected off the instructing body toward the side in the direction on which the detection region of the second light sensor is located. With this, the first light sensor and the second light sensor are capable of receiving the reflected light which is the detection light emitted from the light source 10 and reflected off the instructing body 10.

The reasons are as follows. If the first light sensor receives light reflected off the instructing body toward the negative side of the Y-axis when light reflected off the instructing body is received by the second light sensor disposed on the positive side of the Y-axis, there is high possibility that one of the reflected light received by the second light sensor and the reflected light received by the first light sensor is not reflected light originated from the detection light emitted from the light source 10. This leads to the risk of decrease in accuracy of detecting a position of the instructing body. Thus, it is preferred that the first light sensor and the second light sensor be disposed at such positions that the first light sensor and the second light sensor can receive reflected light which is the detection light emitted from the light source 10 and reflected off the instructing body.

Furthermore, for example, in the input apparatus 100a according to the above-described Embodiment 2, the second light sensors 30a, 30b, 30c, . . . , may be aligned in two or more rows in the Z-axis direction.

Furthermore, for example, the light source 10 according to each of the above-described embodiments includes an optical system (for example, a mirror) that ultimately directs light toward the first direction. This means that the light source includes even a light source that emits light toward a direction different from the first direction as long as the optical system such as a mirror therein ultimately directs the light toward the first direction.

Moreover, each of the above-described apparatuses may more specifically be a computer system configured from a microprocessor, a ROM, a RAM, a hard disk drive, a display unit, a keyboard, and a mouse, for example. A computer program is stored in the RAM or the hard disk drive. Each of the apparatuses achieves its functions as a result of the microprocessor operating according to the computer program. Here, the computer program is configured of pieced together instruction codes indicating a command to the computer in order to achieve a given function.

A portion or all of the components of each of the above-described apparatuses may be configured from one system large scale integration (LSI). A system LSI is a super-multifunction LSI manufactured with components integrated on a single chip, and specifically is a computer system configured of a microprocessor, a ROM, and a RAM, for example. The computer program is stored in the RAM. The system LSI achieves its function as a result of the microprocessor operating according to the computer program.

A portion or all of the components of each of the above-described apparatuses may each be configured from an IC card that is detachably attached to each apparatus or a stand-alone module. The IC card and the module are computer systems configured from a microprocessor, a ROM, and a RAM, for example. The IC card and the module may include the super-multifunction LSI described above. The IC card and the module achieve their functions as a result of the microprocessor operating according to the computer program. The IC card and the module may be tamperproof.

An aspect of the present invention may also be the above-described methods. Moreover, the present invention may also be a computer program realizing these methods with a computer, or a digital signal of the computer program.

Moreover, the present invention may also be realized as the computer program or the digital signal stored on a non-transitory computer-readable recording medium, such as a flexible disk, a hard disk, CD-ROM, MO, DVD, DVD-ROM, DVD-RAM, Blu-Ray™ Disc (BD), or a semiconductor memory. The present invention may also be the digital signal stored on the above-mentioned non-transitory recording medium.

Moreover, the present invention may also be realized by transmitting the computer program or the digital signal, for example, via an electric communication line, a wireless or wired communication line, a network such as the Internet, or data broadcasting.

Moreover, the present invention may be a computer system including a memory storing the computer program and a microprocessor operating according to the computer program.

Moreover, the computer program or the digital signal may be implemented by an independent computer system by being stored on the non-transitory recording medium and transmitted, or sent via the network, for example.

Furthermore, the preceding embodiments and the preceding variation examples may be individually combined.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is useful as an input apparatus or the like that is capable of accurately identifying a position of an instructing body in three-dimensional space with a simple structure and reduced processing load.

The invention claimed is:

1. An input apparatus comprising:
a light source that emits light toward a predetermined region;
a first light-receiving unit that receives light reflected off a subject toward a first region and outputs a first detection signal;
a second light-receiving unit that receives light reflected off the subject toward a second region in a direction substantially perpendicular to a direction in which the light source emits the light, and outputs a second detection signal; and
a control unit that determines a position of the subject using the first detection signal during a period for which the second light-receiving unit detects the reflected light.

2. The input apparatus according to claim 1, wherein the control unit determines the position of the subject using received-light data obtained by the first light-receiving unit receiving light at the same timing as the second light-receiving unit receives reflected light of an amount exceeding a predetermined threshold.

3. The input apparatus according to claim 2, further comprising
a display unit that displays an image; and
an image-forming unit that projects a three-dimensional image to the predetermined region by forming in the predetermined region the image displayed by the display unit.

4. The input apparatus according to claim 3, wherein the display unit comprises display units, and
the display units are aligned in a light emitted direction in which the light source emits light, and each display a display image crossing the light emitted direction.

5. The input apparatus according to claim 4, wherein the second light-receiving unit comprises second light-receiving units, and
each of the second light-receiving units is provided at a position corresponding to a different one of the display units.

6. The input apparatus according to claim 5, wherein the second light-receiving units are disposed at positions that allow each of the second light-receiving units to detect light reflected, in a display region for a corresponding one of the display units, in a direction different from a direction of reflected light for another one of the display units.

7. The input apparatus according to claim 2, further comprising
a projector that projects an image to the predetermined region.

8. The input apparatus according to claim 3, wherein the predetermined region includes an image screen on which the image is formed by the image-forming unit.

9. The input apparatus according to claim 1, wherein the first light-receiving unit receives light reflected off the subject toward one side in the direction substantially perpendicular to the direction from the predetermined region toward the first region, and
the second light-receiving unit receives light reflected off the subject toward the direction substantially perpendicular to the direction from the predetermined region toward the first region.

10. An input apparatus comprising:
a light source that emits detection light toward a first direction, and raster scans a detection interface with the detection light, the detection interface being defined in space;
a first light sensor that is disposed closer to the light source than the detection interface, and detects first reflected light which is the detection light that has been reflected;
a second light sensor that detects second reflected light which is the detection light that has been reflected off an instructing body in a second direction substantially perpendicular to the first direction, the instructing body having entered a detection region extending from the detection interface toward the light source; and a control unit that detects a coordinate value of the instructing body using received-light data obtained by the first light sensor and the second light sensor receiving light at the same timing.

11. The input apparatus according to claim 10, wherein the second light sensor comprises second light sensors, the second light sensors are disposed at different positions in the first direction, and the control unit detects the coordinate value of the instructing body preferentially using, among second reflected light beams detected by the second light sensors, a second reflected light beam detected by, among the second light sensors, a second light sensor disposed close to the light source.

12. The input apparatus according to claim 11, wherein the second light sensors are provided at respective positions corresponding to the display units.

13. The input apparatus according to claim 11, wherein the second light sensors are aligned in the first direction.

14. The input apparatus according to claim 11, wherein a part of the second light sensors is disposed to detect light reflected off the instructing body in the second direction extending along the detection interface, and a remaining part of the second light sensors is disposed to detect light reflected off the instructing body in a third direction different from the second direction extending along the detection interface.

15. The input apparatus according to claim 10, further comprising a projector that projects a mid-air image to the detection region, wherein the control unit changes the mid-air image projected by the projector, according to the detected coordinate value of the instructing body.

16. The input apparatus according to claim 15, wherein the projector includes:

display units aligned in the first direction and each having a display surface crossing the first direction; and an image-forming unit that projects a three-dimensional image as the mid-air image to the detection region by forming in the detection region images displayed on the display units.

17. The input apparatus according to claim 10, wherein the light source starts the raster scan from an area of the detection interface that is on a side on which the second light sensor is provided.

* * * * *